US012645094B1

(12) United States Patent
Jiao

(10) Patent No.: US 12,645,094 B1
(45) Date of Patent: Jun. 2, 2026

(54) IMAGE-STABILIZING ASSEMBLY AND IMAGE-STABILIZING TELESCOPE

(71) Applicant: Chengdu Dinxin Precision Control Tech Co., Ltd., Chengdu (CN)

(72) Inventor: Zhitao Jiao, Chengdu (CN)

(73) Assignee: Chengdu Dinxin Precision Control Tech Co., Ltd., Chengdu (CN)

( * ) Notice: Subject to any disclaimer, the term of this patent is extended or adjusted under 35 U.S.C. 154(b) by 0 days.

(21) Appl. No.: 19/244,251

(22) Filed: Jun. 20, 2025

(30) Foreign Application Priority Data

May 19, 2025 (CN) ........................ 202520986245.X

(51) Int. Cl.
| | |
|---|---|
| *G02B 27/64* | (2006.01) |
| *G02B 7/02* | (2021.01) |
| *G02B 23/02* | (2006.01) |
| *G02B 25/00* | (2006.01) |

(52) U.S. Cl.
CPC ............. *G02B 27/646* (2013.01); *G02B 7/02* (2013.01); *G02B 23/02* (2013.01); *G02B 25/001* (2013.01)

(58) Field of Classification Search
CPC ............ G02B 27/0012; G02B 27/0018; G02B 27/0025; G02B 27/64; G02B 27/642; G02B 27/644; G02B 27/646; G02B 27/648; G02B 23/00; G02B 23/02; G02B 23/16; G02B 23/24; G02B 23/2476
USPC .................................. 359/554–557, 813–824
See application file for complete search history.

(56) References Cited

U.S. PATENT DOCUMENTS

| | | | | |
|---|---|---|---|---|
| 8,982,464 B2 * | 3/2015 | Chan | .................... | G02B 27/646 |
| | | | | 359/554 |
| 10,247,954 B2 * | 4/2019 | Ito | ........................... | G02B 7/28 |
| 2013/0163973 A1 * | 6/2013 | Tanaka | .............. | H04N 23/6812 |
| | | | | 359/557 |

FOREIGN PATENT DOCUMENTS

CN 119002034 A * 11/2024

\* cited by examiner

*Primary Examiner* — Thong Q Nguyen
(74) *Attorney, Agent, or Firm* — Hemisphere Law, PLLC

(57) ABSTRACT

An image-stabilizing assembly adopts a sandwich structure, three sets of coils is disposed on a movable component, and magnetic steels on two sides of each set of coils are respectively disposed on fixed components. The movable component is separated from the fixed components by rolling balls and moves smoothly. The fixed components and the movable component are designed as an integrated assembly. During assembly, corresponding components are simply placed in sequence. This design has advantages of simple structure, easy assembly, convenient debugging, high reliability and high cost-effectiveness. It optimizes a structure of a magnetic steel component, reduces a number and cost of components, simplifies assembly and debugging steps, and decreases a size of an image-stabilizing module. It also features high stabilization accuracy, high integration, simple structure, convenient production, and high cost-effectiveness, and can be integrated into an inside of a Porro prism-type binocular telescope to achieve optical image stabilization.

17 Claims, 4 Drawing Sheets

IMAGE-STABILIZING ASSEMBLY AND IMAGE-STABILIZING TELESCOPE

CROSS-REFERENCE TO RELATED APPLICATION

This application claims priority to Chinese Patent Application No. 202520986245.X, filed on May 19, 2025, which is herein incorporated by reference in its entirety

TECHNICAL FIELD

The disclosure relates to the field of optical stabilization technologies, and more particularly to an image-stabilizing assembly and an image-stabilizing telescope.

BACKGROUND

Binocular telescopes are susceptible to external shaking in handheld or moving scenes, resulting in blurred imaging. Traditional optical stabilization technology compensates for optical path offset by moving lenses or prisms, but it has problems such as complex structure, large volume, high assembly cost, and insufficient control accuracy. In conventional lens stabilization assemblies, multiple sets of U-shaped magnetic yokes are used to drive magnetic steel components, which require separate installation of multiple sets of magnetic steels and coils. This results in a high number of components, cumbersome assembly procedures, and an overall larger size due to the dispersed layout of drive components.

SUMMARY

In view of this, to solve problems of complex structure, large size, and high assembly cost associated with a traditional binocular stabilization device, a purpose of the disclosure is to provide an image-stabilizing assembly and an image-stabilizing telescope. The image-stabilizing assembly adopts a sandwich structure. Three sets of coils are disposed on a movable component in a middle of the image-stabilizing assembly, and magnetic steels on two sides of each set of coils are respectively disposed on fixed components on two sides of the image-stabilizing assembly. The movable component is separated from the fixed components and moves smoothly relative to the fixed components through rolling balls. The fixed components on the two sides and the movable component in the middle are designed as an integrated unit. During assembly, the corresponding components are simply placed in sequence. This design offers advantages of simple structure, easy assembly, convenient debugging, high reliability, and high cost-effectiveness. It optimizes a structure of a magnetic steel assembly, reduces the number and cost of components, simplifies assembly and debugging steps, and decreases a size of an image-stabilizing module. The image-stabilizing assembly also features high stabilization accuracy, high integration, simple structure, convenient production, and high cost-effectiveness, and can be integrated into an inside of a Porro prism-type binocular telescope to achieve optical image stabilization.

To achieve the above purpose, the disclosure provides the following technical solutions.

Based on the above purpose, in a first aspect, the disclosure provides an image-stabilizing assembly, including a front fixed component, a movable component, a rear fixed component and a control circuit. The front fixed component and the rear fixed component are fixedly connected by fasteners, and the movable component is sandwiched between the front fixed component and the rear fixed component to form a sandwich structure. Each of the front fixed component and the rear fixed component is provided with three sets of drive magnetic steels, two sets of the three sets of drive magnetic steels are arranged horizontally, and the other set of the three sets of drive magnetic steels is disposed perpendicular to the two sets of the three sets of drive magnetic steels. The movable component is correspondingly provided with three sets of drive coils, each set of the three sets of drive coils is disposed between a corresponding set of the three sets of drive magnetic steels of the front fixed component and a corresponding set of the three sets of drive magnetic steels of the rear fixed component to form a dual magnetic voice coil motor. Three sets of sensing magnetic steels are disposed on the movable component, three Hall sensors are disposed on corresponding positions of the rear fixed component, and the three sets of sensing magnetic steels and the three Hall sensors are configured to form a displacement detection unit. The movable component is further provided with two image-stabilizing lenses, and the two image-stabilizing lenses are mounted in mounting holes of the movable component respectively. The control circuit is fixedly connected to the rear fixed component and is electrically connected to the three sets of drive coils of the movable component via flexible flat cables.

In a second aspect, the disclosure provides an image-stabilizing telescope. The image-stabilizing telescope includes the image-stabilizing assembly described above, and further includes a dual lens group, a dual Porro prism group, a focusing mechanism, a battery compartment, a telescope housing and a binocular eyepiece group. The dual objective lens group is optically connected to a front end of the image-stabilizing assembly, and the dual Porro prism group is connected behind the two image-stabilizing lenses of the movable component. The focusing mechanism is mechanically connected to the dual objective lens group or the image-stabilizing assembly. The battery compartment is integrated within the telescope housing to supply power to the control circuit. The binocular eyepiece group is optically connected to an output end of the dual Porro prism group.

Compared to the related art, the image-stabilizing assembly and the image-stabilizing telescope provided by the disclosure may have the following beneficial effects.

The image-stabilizing assembly and the image-stabilizing telescope of the disclosure adopts a sandwich layout and a dual magnetic steel design to reduce the number of components. During assembly, the components only need to be stacked in sequence and secured with screws, which optimizes a structure of the magnetic steel assembly, reduces the number and cost of the components, simplifies assembly and debugging steps, and decreases a volume of the image-stabilizing module. Hall closed-loop feedback combined with synchronous drive strategy is adopted, which has high displacement control precision and minimal deflection error, thereby achieving high-precision image stabilization. Moreover, the shared utilization of bilateral magnetic fields by magnets and coils reduces material costs and fits a compact space of the Porro prism-type telescope. In addition, the movable component can be alternatively provided with a CMOS sensor or a lens group, which is suitable for various optical devices such as cameras and microscopes. It can be integrated into an inside of the Porro prism-type binocular telescope to achieve optical image stabilization, offering strong versatility. The image-stabilizing assembly and the image-stabilizing telescope of the disclosure realize high-precision stabilization functionality by optimizing magnetic steel layout, simplifying drive structure, and integrating closed-loop feedback control, while reducing size, cost, and assembly complexity.

These and other aspects of the disclosure will become more apparent from following detailed description of embodiments. It should be understood that the above general description and the following detailed description are merely exemplary and explanatory and are not intended to limit the scope of the disclosure.

BRIEF DESCRIPTION OF DRAWINGS

In order to more clearly illustrate technical solutions in embodiments of the disclosure or in the related art, a brief introduction to attached drawings that be used in the description of the illustrative embodiments or the related art is provided below. The attached drawings are intended to provide a further understanding of the disclosure, and are together with the embodiments of the disclosure to explain the disclosure, but do not limit the scope of the disclosure.

DESCRIPTION OF REFERENCE SIGNS

Figure 1:
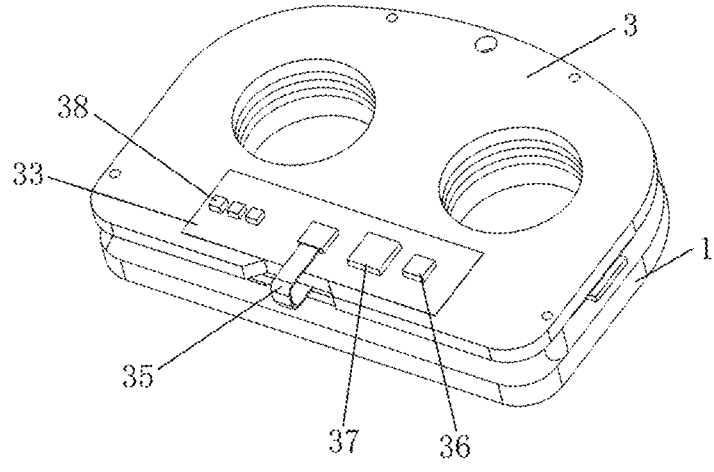
FIG. 1 illustrates a schematic structural diagram of an image-stabilizing assembly provided by the disclosure.

100—image-stabilizing assembly; 1—front fixed component; 2—movable component; 3—rear fixed component; 11—front drive magnetic steel; 21—drive coil; 22—sensing magnetic steel; 23—image-stabilizing lens; 24—mounting hole; 25—pressing mechanism; 26—attraction magnetic steel; 27—attraction ferrous plate; 28—magnetic ferrous plate; 31—rear drive magnetic steel; 32—Hall sensor; 33—control circuit; 34—fastener; 35—flexible flat cable; 36—gyroscope; 37—microprocessor; 38—driver chip; 4—rolling ball separation structure; 41—rolling ball; 5—dual objective lens group; 51—objective lens barrel; 52—objective lens element; 6—binocular eyepiece group; 61—distance adjustment plate; 7—adjustment shaft; 8—telescope housing; 81—cover; 82—housing; 83—protective cover; 84—battery compartment; 9—dual Porro prism group.

DETAILED DESCRIPTION OF EMBODIMENTS

Below, in conjunction with attached drawings and specific embodiments, a further description of the disclosure is provided. It should be noted that, without conflicting, the various embodiments or technical features described below may be combined in any manner to form new embodiments.

To provide a clearer understanding of purposes, technical solutions, and advantages of the disclosure, following detailed description of the embodiments is provided in conjunction with specific embodiments and with reference to the attached drawings. It should be understood that the specific embodiments described herein are intended solely to explain the disclosure and are not intended to limit the scope of the disclosure.

It should be noted that in the embodiments of the disclosure, the use of terms "first" and "second" is solely for a purpose of distinguishing between two different entities or parameters that have a same name. Therefore, the terms "first" and "second" are used merely for convenience of description and should not be construed as limiting the scope of the disclosure. In addition, terms "include", "have" and any of their variations are intended to cover non-exclusive inclusion. For example, a process, a method, a system, a product, or a device that includes a series of steps or units inherently includes other steps or units.

Below, the technical solutions in the embodiments of the disclosure will be clearly and completely described in conjunction with the attached drawings. It should be apparent that the described embodiments are only a part of the embodiments of the disclosure, and not all of them. Based on the embodiments in the disclosure, any other embodiments obtained by those skilled in the art without making any inventive effort are within the scope of protection of the disclosure.

Flowcharts shown in the attached drawings are merely illustrative and are not required to include all content and operations or steps, nor are they required to be performed in the described order. For example, some operations or steps may be decomposed, combined, or partially merged, and thus the actual order of execution may vary depending on the specific circumstances.

Below, some embodiments of the disclosure will be described in detail with reference to the attached drawings. Without conflicting, the embodiments described below and the features thereof may be combined with each other.

In a conventional lens stabilization assembly, multiple drive magnetic steel components with U-shaped magnetic yokes are used to improve the driving efficiency of the power supply, which leads to complex structure, cumbersome assembly processes, increased cost, and larger size and weight. In view of this, the disclosure provides an image-stabilizing assembly and an image-stabilizing telescope, which have advantages of high stabilization accuracy, high integration, simple structure, convenient production, and high cost-effectiveness. The image-stabilizing assembly can be integrated into an inside of a Porro prism-type binocular telescope to achieve optical image stabilization. Compared to the related art, the disclosure optimizes a structure of a magnetic steel assembly, reduces the number and cost of components, simplifies assembly and debugging steps, and decreases a size of an image-stabilizing module.

Figure 2:
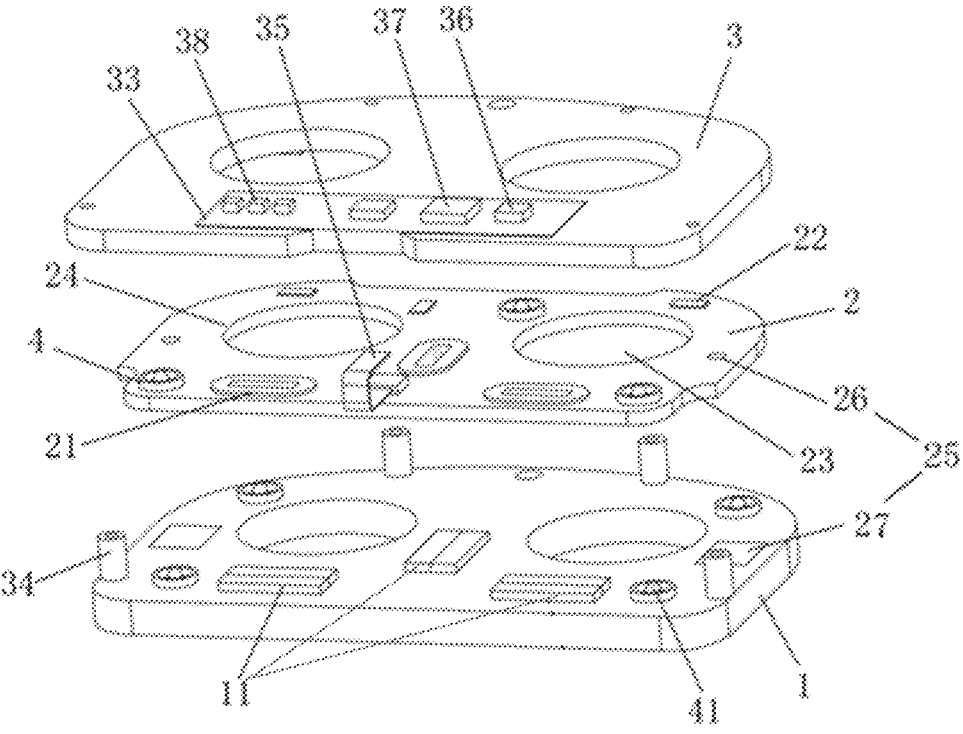
FIG. 2 illustrates an exploded view of the image-stabilizing assembly provided by the disclosure, as viewed from above.
Figure 3:
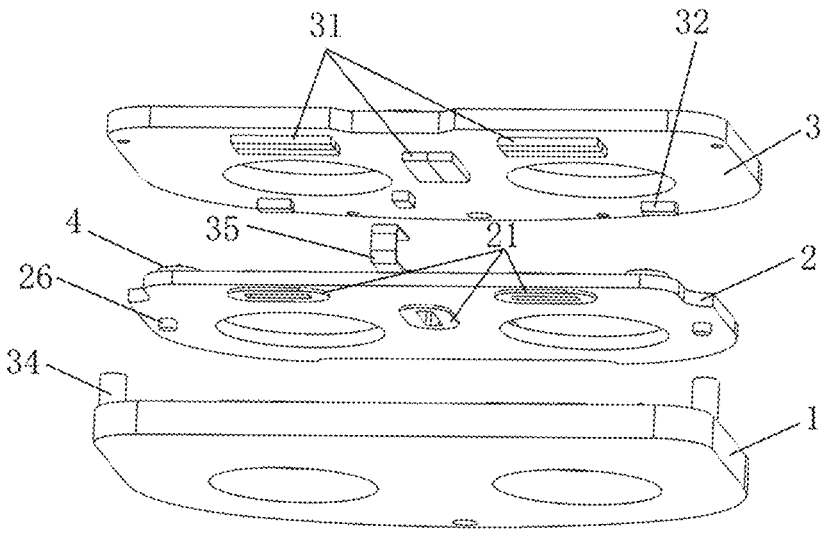
FIG. 3 illustrates an exploded view of the image-stabilizing assembly provided by the disclosure, as viewed from below.
Figure 4:
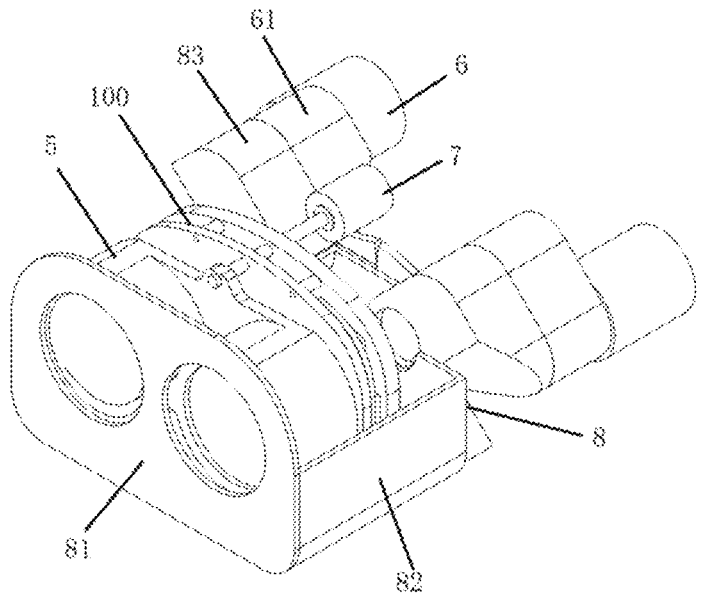
FIG. 4 illustrates a schematic structural diagram of an image-stabilizing telescope provided by the disclosure.
Figure 5:
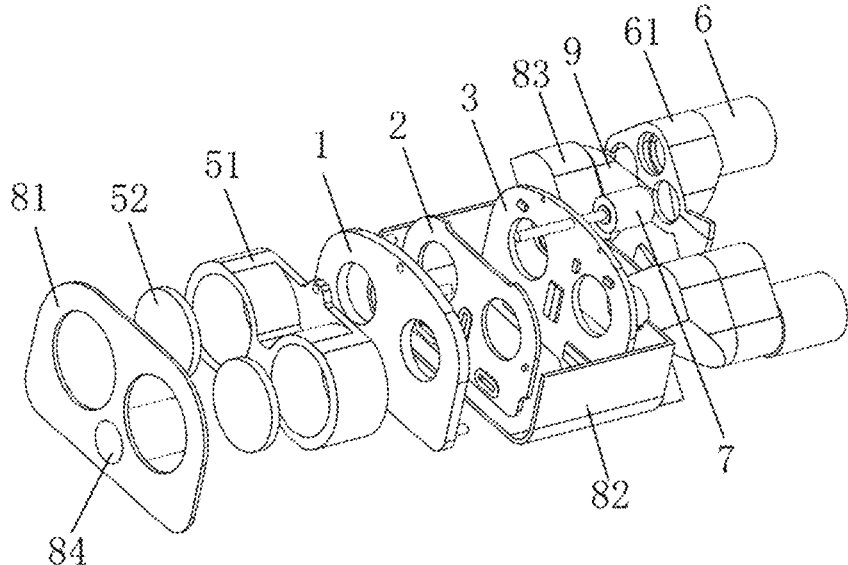
FIG. 5 illustrates an exploded view of the image-stabilizing telescope provided by the disclosure.
Figure 6:
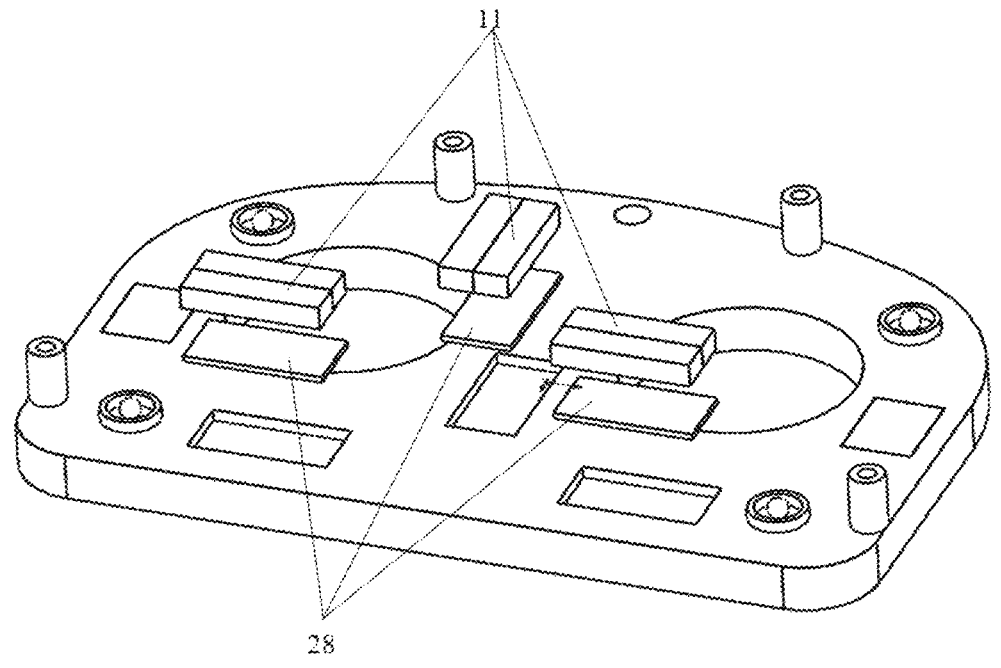
FIG. 6 illustrates an exploded view of three sets of front drive magnetic steels and corresponding magnetic ferrous plates of the imaging-stabilizing assembly provided by the disclosure.
Figure 7:
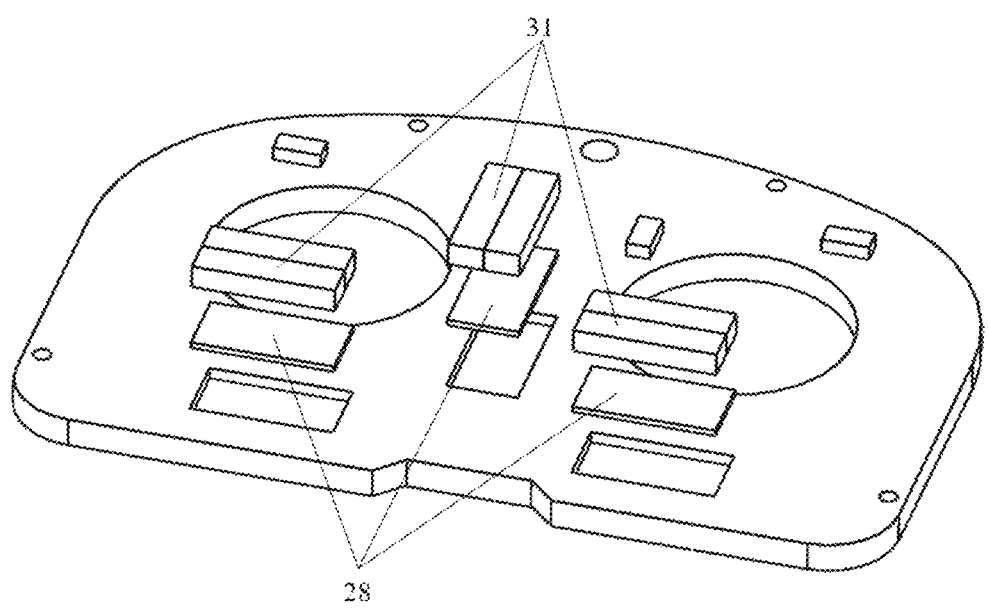
FIG. 7 illustrates an exploded view of three sets of rear drive magnetic steels and corresponding magnetic ferrous plates of the image-stabilizing assembly provided by the disclosure.

Referring to FIG. 1 through FIG. 3, an embodiment of the disclosure provides an image-stabilizing assembly, which includes a front fixed component 1, a movable component 2, a rear fixed component 3 and a control circuit 33. The front fixed component 1 and the rear fixed component 3 are fixedly connected by screws and supports as fasteners 34. The movable component 2 is sandwiched between the front fixed component 1 and the rear fixed component 3 to form a sandwich structure. Each of the front fixed component 1 and the rear fixed component 3 is provided with three sets of drive magnetic steels, two sets of drive magnetic steels are arranged horizontally, and the other set of drive magnetic steels is disposed perpendicular to the two sets of drive magnetic steels. Specifically, the front fixed component 1 is provided with three sets of front drive magnetic steels 11, and the rear fixed component 3 is provided with three sets of rear drive magnetic steels 31. The movable component 2 is correspondingly provided with three sets of drive coils 21, and each set of drive coils 21 is disposed between a corresponding set of drive magnetic steels of the front fixed component 1 and a corresponding set of drive magnetic steels of the rear fixed component 3 to form a dual magnetic voice coil motor. Three sets of sensing magnetic steels 22 are disposed on the movable component 2, and three Hall sensors 32 are disposed on corresponding positions of the rear fixed component 3. The three sets of sensing magnetic steels 22 and the three Hall sensors 32 are configured to form a displacement detection unit. The movable component 2 is further provided with two image-stabilizing lenses 23 (also referred as anti-shake lenses), and the two image-stabilizing lenses 23 are mounted in mounting holes 24 of the movable component 2 respectively. The control circuit 33 is fixedly connected to the rear fixed component 3 and is electrically connected to the three sets of drive coils 21 of the movable component 2 via flexible flat cables 35.

In the embodiment, a pressing mechanism 25 is disposed between the front fixed component 1 and the movable component 2, and the pressing mechanism 25 is a tension spring or a magnetic attraction structure, and is configured to apply a pre-tension force between the front fixed component 1 and the movable component 2. The magnetic attraction structure includes an attraction ferrous plate 27 and an attraction magnetic steel 26, and is configured to achieve clamping between the front fixed component 1 and the movable component 2 through a magnetic force between the attraction ferrous plate 27 and the attraction magnetic steel 26. Rolling ball separation structures 4 are respectively disposed between the front fixed component 1 and the movable component 2, and between the rear fixed component 3 and the movable component 2. The movable component 2 is separated from the front fixed component 1 and the rear fixed component 3 by the rolling ball separation structures 4, and the movable component 2 is configured to move smoothly through the rolling ball separation structures 4. Each of the rolling ball separation structures 4 includes multiple rolling balls 41 in rolling contact. The movable component 2 and the front fixed component 1 are connected by the tension spring or the magnetic attraction structure of the pressing mechanism 25, making the movable component 2 is in close contact with the front fixed component 1 through the rolling balls 41 and move with low resistance in a plane.

In the embodiment, the image-stabilizing assembly adopts the sandwich structure. Three sets of coils are disposed on the movable component 2 in the middle of the image-stabilizing assembly, and magnetic steels on two sides of each set of coils are respectively disposed on the front fixed component 1 and the rear fixed component 3 on two sides of the image-stabilizing assembly. The movable component 2 is separated from the front fixed component 1 and the rear fixed component 3 by the rolling balls 41 and moves smoothly. The front fixed component 1, the rear fixed component 3 on the two sides and the movable component 2 in the middle are designed as an integrated unit. During assembly, the corresponding components are simply placed in sequence. This design offers advantages of simple structure, easy assembly, convenient debugging, high reliability, and high cost-effectiveness.

In the embodiment, the control circuit 33 is integrated with a gyroscope 36, a microprocessor 37 and a driver chip 38, and is electrically connected to the three sets of drive coils 21 via the flexible flat cables 35. The control circuit 33 is directly configured to be a structural substrate of the rear fixed component 3. The three sets of drive magnetic steels are disposed at designated positions on the control circuit 33, and the gyroscope 36 and the microprocessor 37 are integrated on the control circuit 33. The microprocessor 37 is configured to generate anti-shake compensation target values based on gyroscope 36 data and to control voice coil motors to move via feedback from the Hall sensors 32.

In the embodiment, each set of drive magnetic steels is a left-right magnetized magnetic steel, or is a magnetic steel formed by joining two up-down magnetic steels.

In the embodiment, the displacement detection unit includes the three sets of sensing magnetic steels 22 and the three Hall sensors 32 disposed on the rear fixed component 3. The displacement detection unit is configured to detect relative positions of a left-side vertical movement, a right-side vertical movement and a horizontal movement. Specifically, two Hall sensors 32 in the displacement detection unit are configured to detect vertical displacement of the movable component 2 respectively, and the other of the three Hell sensors 32 is configured to detect horizontal displacement of the movable component 2.

Referring to FIGS. 1-7, an embodiment of the disclosure further provides an image-stabilizing telescope. The image-stabilizing telescope includes the image-stabilizing assembly 100, and further includes a dual objective lens group 5, a dual Porro prism group 9, a focusing mechanism, a battery compartment 84, a telescope housing 8 and a binocular eyepiece group 6. The dual objective lens group 5 is optically connected to a front end of the image-stabilizing assembly 100. The dual objective lens group 5 includes an objective lens barrel 51 and an objective lens element 52 disposed in the objective lens barrel 51. A front end of the objective lens barrel 51 is provided with a cover 81, and the cover 81 is connected to a housing 82. A rear end of the housing 82 is connected to a protective cover 83 disposed on an outer side of the binocular eyepiece group 6. The cover 81, the housing 82 and the protective cover 83 are configured to form the telescope housing 8 together. The dual Porro prism group 9 is connected behind the image-stabilizing lenses 23 of the movable component 2. The focusing mechanism is an adjustment shaft 7, and is mechanically connected to the dual objective lens group 5 or the image-stabilizing assembly 100. The battery compartment 84 is integrated within the telescope housing 8 to supply power to the control circuit 33. The binocular eyepiece group 6 is optically connected to an output end of the dual Porro prism group 9, and a distance adjustment plate 61 is disposed on the binocular eyepiece group 6.

In the embodiment, the dual Porro prism group 9 is configured to be a reverse Porro structure, and the image-stabilizing assembly 100 is disposed in an optical path between the dual objective lens group 5 and the dual Porro prism group 9.

In the embodiment, a magnetic ferrous plate 28 is mounted as a magnetic yoke on an outer side of each set of drive magnetic steels of each of the front fixed component 1 and the rear fixed component 3 opposite to and facing away from a corresponding set of drive coils 21.

In the embodiment, two CMOS sensors are alternatively disposed on the movable component 2 to form an anti-shake imaging module (also referred as stabilizing imaging module) for a binocular camera, which is used for binocular cameras. Alternatively, the movable component 2 can be provided with the two image-stabilizing lenses 23 for use in telescopes.

A control method for the image-stabilizing assembly and the image-stabilizing telescope in the embodiment is as follows. Each voice coil motor corresponds to a set of Hall element and detection magnetic steel (i.e., the sensing magnetic steel 22) as feedback for a position of movement. A pair of voice coil motors on the left and right simultaneously drives the movable component 2 to move up and down without tilting through synchronized control. A voice coil motor in the middle drives the movable component 2 to move left and right. Specifically, for example, a microcontroller is GD32F103, the gyroscope 36 is ICM20602, and the Hall element is SS49E. A control program for the microcontroller is developed to read the gyroscope 36 data to obtain vibration information of the telescope, calculate the compensation target values in the up-down and left-right directions, read Hall element data to obtain an offset distance of the movable component 2 relative to the fixed components, and run a feedback control algorithm to drive the drive coils 21, to push the corresponding set of magnetic steels to move, so that the movement of the movable component 2 follows the compensation target values brought by the vibration. The Hall elements A and B, arranged on the left and right, simultaneously detect the movement in the up-down direction, and drive the corresponding two sets of coils A and B through feedback control to push the movable component 2. The position data of the two Hall elements A and B change simultaneously and remain consistent, achieving synchronized up-down movement of the two lenses and preventing tilting.

The telescope uses the reverse Porro prism structure. The anti-shake assembly (i.e., the image-stabilizing assembly 100) is disposed between the left and right pairs of Porro prisms and the dual objective lens group 5. The fixed components of the image-stabilizing assembly 100 are fixedly connected to an inside of the telescope housing 8. Focusing is achieved by controlling the dual objective lens group 5 or the image-stabilizing assembly 100 to move forward or backward by using the adjustment shaft 7. In addition to the image-stabilizing assembly 100, the telescope also includes two groups of objective lenses, two groups of Porro prisms, two groups of eyepieces, the focusing mechanism, housing components, the battery compartment 84, and switch buttons.

During control operations, each servo assembly includes a set of motion mechanism (coil and drive magnetic steel) and a displacement sensing mechanism (Hall element and sensing magnetic steel 22) corresponding to a motion direction of the motion mechanism. The servo assemblies on left and right sides are used for up-down movements, the two drive components synchronously execute to achieve up-down movements to eliminate a yaw motion around the optical axis. The other set of servo assemblies is used for left-right movements. The microcontroller acquires vibration data of an external device through the gyroscope 36 and calculates target values of motion for the three sets of servo assemblies based on an anti-shake control ratio. Feedback on the motion of the corresponding motion mechanism is obtained through the Hall sensor 32, the microcontroller separately runs three feedback control algorithms to achieve precise motion control of the three sets of servo assemblies, and tracks the motion target values to realize an anti-shake function of the optical path.

In the embodiment, in operation of the image-stabilizing telescope of the disclosure, the microprocessor 37 processes vibration data from the gyroscope 36 in real-time to generate compensation target values, simultaneously compares the vertical displacement feedback from the Hall sensor 32, and drives two vertical voice coil motors through a PID control algorithm to achieve bias-free translation. In addition, the microprocessor 37 independently controls a horizontal voice coil motor to compensate for lateral vibration.

The above embodiments are illustrative embodiments disclosed in the disclosure, but it should be noted that various changes and modifications can be made without departing from the scope of the disclosed embodiments of the disclosure as defined by the claims. The functions, steps, or actions of the method claims described herein do not need to be performed in any specific order. In addition, although the elements disclosed in the embodiments of the disclosure may be described or claimed in individual form, they can also be understood as multiple unless explicitly limited to the singular.

It should be understood that, unless the context clearly supports an exception, a singular form "a" or "an" is intended to include a plural form as well. It should also be understood that a term "and/or" as used herein refers to and includes any and all possible combinations of one or more of the associated listed items. The embodiment numbers disclosed in the embodiments of the disclosure are for description only and do not represent the superiority or inferiority of the embodiments.

Those skilled in the art should understand that the discussion of any embodiment is merely illustrative and is not intended to suggest that the scope of the disclosed embodiments of the disclosure (including the claims) is limited to these embodiments. Under the concept of the embodiments of the disclosure, the technical features of the above embodiments or different embodiments may also be combined, and there are many other variations in different aspects of the embodiments of the disclosure as mentioned above, which are not provided in detail for the sake of brevity. Therefore, any omission, modification, equivalent substitution, improvement, etc., made within the spirit and principles of the embodiments of the disclosure should be included within the scope of protection of the embodiments of the disclosure.

What is claimed is:

1. An image-stabilizing assembly, comprising a front fixed component, a movable component, a rear fixed component and a control circuit;

wherein the front fixed component and the rear fixed component are fixedly connected by fasteners, and the movable component is sandwiched between the front fixed component and the rear fixed component to form a sandwich structure;

wherein each of the front fixed component and the rear fixed component is provided with three sets of drive magnetic steels, two sets of the three sets of drive magnetic steels are arranged horizontally, and the other set of the three sets of drive magnetic steels is arranged in a direction disposed perpendicular to a direction defined by the two sets of the three sets of drive magnetic steels;

wherein the movable component is correspondingly provided with three sets of drive coils, each set of the three sets of drive coils is disposed between a corresponding set of the three sets of drive magnetic steels of the front fixed component and a corresponding set of the three sets of drive magnetic steels of the rear fixed component to form a dual magnetic voice coil motor; and wherein three sets of sensing magnetic steels are disposed on the movable component, three Hall sensors are disposed on corresponding positions of the rear fixed component, and the three sets of sensing magnetic steels and the three Hall sensors are configured to form a displacement detection unit; and the control circuit is fixedly connected to the rear fixed component and is electrically connected to the three sets of drive coils of the movable component via flat cables.

2. The image-stabilizing assembly as claimed in claim 1, wherein a pressing mechanism is disposed between the front fixed component and the movable component, and the pressing mechanism is a tension spring or a magnetic attraction structure comprising an attraction ferrous plate and an attraction magnetic steel, and the pressing mechanism is configured to apply a pre-tension force between the front fixed component and the movable component; and the movable component is further provided with two image-stabilizing lenses, and the two image-stabilizing lenses are mounted in mounting holes of the movable component respectively.

3. The image-stabilizing assembly as claimed in claim 2, wherein rolling ball separation structures are respectively disposed between the front fixed component and the movable fixed component, and between the rear fixed component and the movable component, the movable component is separated from the front fixed component and the rear fixed component by the rolling ball separation structures, and the movable component is configured to move smoothly through the rolling ball separation structures; and each of the rolling ball separation structures comprises a plurality of rolling balls in rolling contact.

4. An image-stabilizing telescope, comprising the image-stabilizing assembly as claimed in claim 2, wherein the image-stabilizing telescope further comprises a dual objective lens group, a dual Porro prism group, a focusing mechanism, a battery compartment, a telescope housing and a binocular eyepiece group;

wherein the dual objective lens group is optically connected to a front end of the image-stabilizing assembly, and the dual Porro prism group is connected behind the two image-stabilizing lenses of the movable component;

wherein the focusing mechanism is mechanically connected to the dual objective lens group or the image-stabilizing assembly, and the focusing mechanism is an adjusting shaft;

wherein the battery compartment is integrated within the telescope housing to supply power to the control circuit; and wherein the binocular eyepiece group is optically connected to an output end of the dual Porro prism group.

5. The imaged-stabilizing telescope as claimed in claim 4, wherein the image-stabilizing assembly is mounted in an optical path between the dual objective lens group and the dual Porro prism group.

6. The image-stabilizing telescope as claimed in claim 4, wherein a magnetic ferrous plate is mounted as a magnetic yoke on an outer side of each set of the three sets of drive magnetic steels of each of the front fixed component and the rear fixed component opposite to and facing away from a corresponding set of the three sets of drive coils.

7. The image-stabilizing telescope as claimed in claim 4, wherein the dual objective lens group comprises an objective lens barrel and an objective lens element disposed in the lens barrel;

wherein the telescope housing comprises a cover, a housing and a protective cover, the cover is disposed at a front end of the objective lens barrel and is connected to the housing, and a rear end of the housing is connected to the protective cover disposed on an outer side of the binocular eyepiece group; and wherein a distance adjustment plate is disposed on the binocular eyepiece group.

8. The image-stabilizing assembly as claimed in claim 1, wherein the control circuit is integrated with a gyroscope, a microprocessor and a driver chip.

9. The image-stabilizing assembly as claimed in claim 8, wherein the control circuit is directly configured to be a structural substrate of the rear fixed component, the three sets of drive magnetic steels on the rear fixed component are disposed at designated positions on the control circuit, and the gyroscope and the microprocessor are integrated on the control circuit.

10. The image-stabilizing assembly as claimed in claim 9, wherein each set of the three sets of drive magnetic steels is a left-right magnetized magnetic steel, or is a magnetic steel formed by joining two up-down magnetized magnetic steels.

11. The image-stabilizing assembly as claimed in claim 10, wherein two of the three Hall sensors in the displacement detection unit are configured to detect vertical displacement of the movable component respectively, and the other of the three Hall sensors is configured to detect horizontal displacement of the movable component.

12. An image-stabilizing assembly, comprising:

a front fixed component, provided with three sets of front drive magnetic steels, wherein two sets of the three sets of front drive magnetic steels are horizontally arranged, and the other set of the three sets of front drive magnetic steels is arranged in a direction perpendicular to a direction defined by the two sets of the three sets of front drive magnetic steels;

a rear fixed component, fixedly connected to the front fixed component, wherein the rear fixed component is provided with three sets of rear drive magnetic steels, two sets of the three sets of rear drive magnetic steels are horizontally arranged, and the other set of the three sets of rear drive magnetic steels is arranged in a direction perpendicular to a direction defined by the two sets of the three sets of rear drive magnetic steels; and three Hall sensors are disposed on the rear fixed component;

a movable component, disposed between the front fixed component and the rear fixed component, wherein three sets of drive coils are disposed on the movable component corresponding to positions of the three sets of front drive magnetic steels and the three sets of rear drive magnetic steels, three sets of sensing magnetic steels are disposed on the movable component, and the three sets of sensing magnetic steels and the three Hall sensors are configured to form a displacement detection unit; and two image-stabilizing lenses are mounted on mounting holes of the movable component; and a control circuit, fixedly connected to the rear component, and electrically connected to the three sets of drive coils on the movable component.

13. The image-stabilizing assembly as claimed in claim 12, wherein rolling ball separation structures are respectively disposed between the front fixed component and the movable fixed component, and between the rear fixed component and the movable component, the movable component is separated from the front fixed component and the rear fixed component by the rolling ball separation structures, and the movable component is configured to move smoothly through the rolling ball separation structures; and each of the rolling ball separation structures comprises a plurality of rolling balls in rolling contact.

14. The image-stabilizing assembly as claimed in claim 12, wherein each set of the three sets of front drive magnetic steels or rear drive magnetic steels is a left-right magnetized magnetic steel, or is a magnetic steel formed by joining two up-down magnetized magnetic steels.

15. The image-stabilizing assembly as claimed in claim 12, wherein two of the three Hall sensors in the displacement detection unit are configured to detect vertical displacement of the movable component respectively, and the other of the three Hall sensors is configured to detect horizontal displacement of the movable component.

16. The image-stabilizing assembly as claimed in claim 12, wherein a magnetic ferrous plate is mounted as a magnetic yoke on an outer side of each set of the three sets of front drive magnetic steels of the front fixed component opposite to and facing away from a corresponding set of the three sets of drive coils.

17. The image-stabilizing assembly as claimed in claim 12, wherein a magnetic ferrous plate is mounted as a magnetic yoke on an outer side of each set of the three sets of rear drive magnetic steels of the rear fixed component opposite to and facing away from a corresponding set of the three sets of drive coils.

* * * * *